Patented Oct. 20, 1953

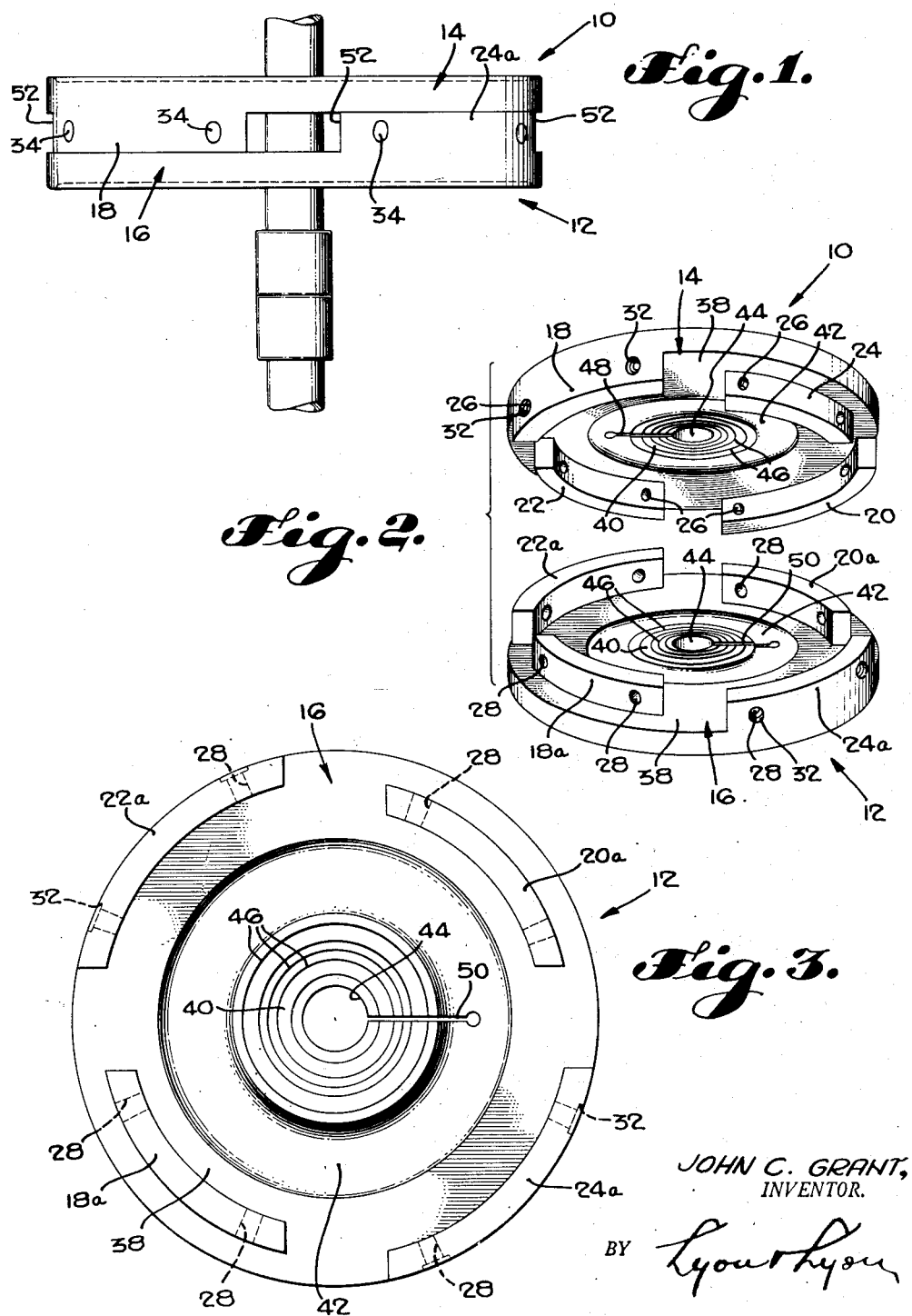

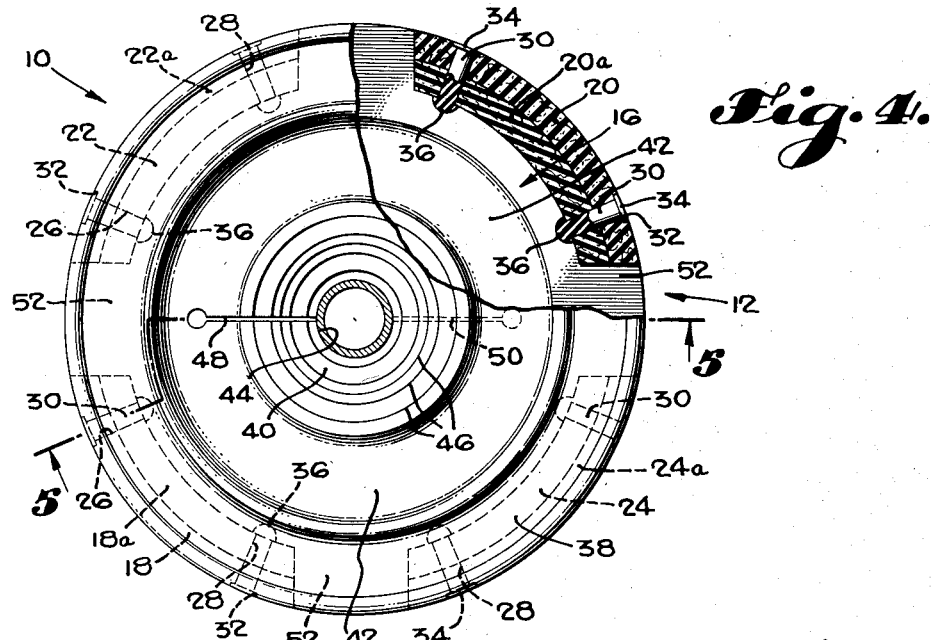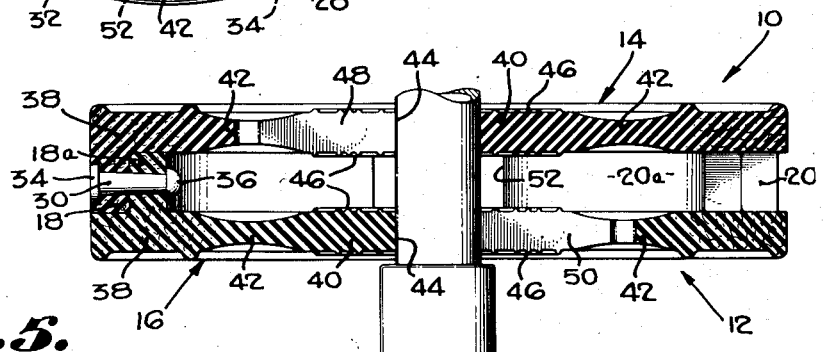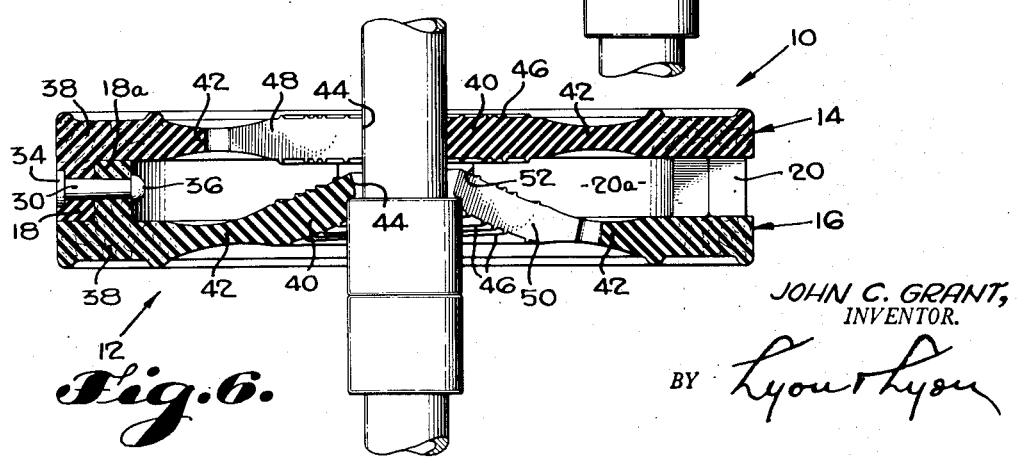

2,655,679

UNITED STATES PATENT OFFICE 2,655,679

TANDEM TYPE PIPE WIPER

John C. Grant, Los Angeles, Calif., assignor to Byron Jackson Co., Vernon, Calif., a corporation of Delaware Application January 22, 1949, Serial No. 72,133

11 Claims. (Cl. 15—210)

My invention relates to pipe wipers, and particularly to the dual or tandem type pipe wiper.

While heretofore structures have existed in the prior art for providing wiping of drill pipe by both a lower wiping element and an upper wiping element, these structures have possessed the disadvantages of requiring replacement of the entire unit even where but one of the wiping elements has failed. While a few such structures do permit single wiper element replacement, in all cases such structures require a difficult disassembly of either housing elements or bolting elements and the like. Further, such structures are bulky, expensive of construction, and complicated of assembly.

It has been found desirable in this art that not only should the primary purpose of providing a lower wiping element and an upper wiping element for dual wiping action be achieved in a structure, but also that such structure should be simple, should avoid metal parts where possible, should permit a flow-out of fluid caught between upper and lower wiping elements which may have passed the lower wiping elements, and above all, should be uncomplicated, simply constructed, and easily assembled and disassembled.

It is consequently my principal purpose to provide a tandem type pipe wiper which avoids the necessity of any housing but which simply comprises two basic elements so formed as to permit interfitting cooperation for assembly into a single integral operative unit.

It is my further object to provide such tandem pipe wiper of a form easily disassembled so that should either element wear out, the unit may be taken apart, such element replaced with a new element, and the unit quickly reassembled for operation.

Another of my objects is to provide in the forming of the elements of my pipe wiper for interfitting relationship such shape of said elements that, upon assembly thereof into the operative unit, ports are provided about the periphery of the unit to permit the exit of fluids which may have passed through the lower element.

Yet another of my objects is to provide a simple and yet effective means for connecting together the interfitting portions of the two aforementioned elements.

Further objects of the invention will appear hereinafter.

In the drawings:

Figure 1 shows my tandem or dual type pipe wiper in operative position about the drill pipe.

Figure 2 shows an exploded view of the two wiper elements in position for interfitting assembly.

Figure 3 shows a top plan view of the bottom wiping element.

Figure 4 shows partly broken away a top plan view of the assembled unit.

Figure 5 shows a sectional view of the unit in operative position about the drill pipe, said view being taken on the line 5—5 of Figure 4.

Figure 6 shows the view of Figure 5, but shows the drill pipe being drawn through the wiper.

Referring to the drawings, it will be seen that the wiping elements 10 and 12 each comprise substantially flat base members 14 and 16, respectively, from which extend integrally concentric segmental spacer webs. In the case of the wiping element 10, two of said spacer webs 18 and 20 are spaced diametrically opposite each other at the outer extremity of the base member 14, while the remaining two webs 22 and 24 are displaced 90° from the webs 18 and 20, respectively, and are spaced radially inwardly a sufficient distance so that the inner surfaces of the outer webs 18 and 20 approximately coincide with a cylinder defined by the outer surfaces of the inner webs 22 and 24. Corresponding to the spacer webs 18, 20, 22 and 24 of the wiping element 10 are spacer webs on the wiping element 12. It will be seen that the wiping element 12 is a duplicate of the wiping element 10, and that it contains two inner spacer webs 18a and 20a and two outer spacer webs 22a and 24a.

Referring particularly to Figure 2, the interfitting nature of these wiping elements is apparent. The wiping elements 10 and 12 may be brought together from the positions assumed in Figure 2 and, when this is done, outer spacer web 18 of the wiping element 10 receives radially inwardly of itself and against itself inner spacer web 18a of wiping element 12. Similarly, the spacer webs 20 of wiping element 10, and 20a of wiping element 12 coact. Inner spacer web 22 of wiping element 10 fits within and against outer spacer web 22a of wiping element 12 and similarly the spacer webs 24 and 24a coact. Thus, as a result of such interfitting relationship of the various spacer web pairs, relative transverse movement between the wiping elements 10 and 12 is prevented.

Each spacer web has formed therethrough two holes, said holes being shown as 26 in wiping element 10 and as 28 in wiping element 12. When the wiping elements are brought together and interfitted, each two holes 26 in the spacer webs of wiping element 10 register with each two holes 28 in the spacer webs of wiping element 12. The holes 26 and 28 are slightly tapered and are adapted to receive tapered pins 30 of rubber or other flexible material which serve to retain the wiping elements together. It will be noted that the holes 26 and 28 of the outer spacer webs 18, 20, 22a and 24a provide enlarged portions 32 to receive the heads 34 of the tapered pins 30 and that the inner ends of the pins 30 are provided with knobs 36 which compress during insertion of the pins through the holes 26 and 28 but which expand to full size following such insertion to lock the pins in position.

The wiping elements 10 and 12 are preferably composed of rubber or similar flexible material, and due to the webbing, the outer portions thereof are quite stiff. Additionally, if desired, a fabric reinforcement may be added to the rubber composition of each element at its outer portion so that additional body is provided to enable each wiping element to retain its form under the stresses of different wiping actions.

Each flexible wiping element therefore may consist of a relatively stiff outer portion 38 and an inner wiping portion 40. It has been found desirable, in order to facilitate the flexing of the center portions 40 of each wiping element, to provide in each case a portion 42 of reduced cross-section connecting said outer and inner portions. Each inner portion 40 is provided with a hole 44 through which the drill pipe passes, the hole being preferably made somewhat smaller in diameter than the drill pipe so that there is a constant wiping pressure exerted on the pipe. One or both surfaces of the central portion 40 of each wiping element may be provided with a plurality of concentric beads 46 which permit the customer to cut the wiping element around any one of said concentric beads so that the wiping element may be conformed to the size of drill pipe which is being used. It is notable that when the wiper has been worn out at this size, it may be further cut back to accommodate a larger size drill pipe.

To facilitate passing tool joints, casing protectors, and other enlargements on the drill string through the wiping elements, a radial slot is formed in the center portion of each base member. Such a slot is shown as 48 on the wiping element 10 and as 50 on the wiping element 12. When the wiping elements 10 and 12 are assembled and interlocked, it will be seen that the two slots are spaced 180° apart so that well fluid passing through the slot 50 of the lower wiping element 12 is caught by the unslotted wiping surface of the upper wiping element 10.

In assembly, the wiping elements 10 and 12 are simply placed in juxtaposition facing each other, as shown in Figure 2, and wiping element 10 placed on wiping element 12. This will interfit the spacing webs 18 and 18a, 20 and 20a, 22 and 22a, and 24 and 24a, respectively. The pins 30 are then inserted through the holes 26 and 28 and are held in place by friction and also by the enlarged knobs 36. The arcuate lengths of the respective spacer webs 18 and 18a, 20 and 20a, 22 and 22a, and 24 and 24a are such that four ports 52 are left, providing ingress to the interior of the assembled unit and thus egress for fluid which may have passed the lower wiping element 12 into the interior of the unit.

While there has been described what is at present considered a preferred embodiment of the present invention, it will be apparent to those skilled in the art that various modifications and changes may be made without departing from the essence of the invention, and it is intended to cover herein all such modifications and changes as come within the true scope and spirit of the appended claims.

I claim:

1. A pipe wiper comprising a pair of complementary wiper members, each member comprising a radially inner flexible portion having a central pipe-receiving opening and a radially outer portion having at least one spacer web extending axially therefrom toward the other web member, a spacer web on one wiper member being radially offset with respect to a complementary spacer web on the other wiper member, and means interconnecting said wiper members in assembled relation with said spacer webs telescopically interfitted in nested relation, whereby to maintain said flexible portions in axially spaced parallel relation and said pipe-receiving openings in axial alignment.

2. A pipe wiper comprising a pair of complementary wiper members, each member comprising a radially inner flexible portion having a central pipe-receiving opening and a radially outer portion having at least one pair of spacer webs extending axially therefrom toward the other wiper member, a pair of spacer webs on one wiper member being radially offset with respect to a complementary pair of spacer webs on the other wiper member, and means interconnecting said wiper members in assembled relation with said pairs of spacer webs telescopically interfitted in nested relation whereby to maintain said flexible portions in axially spaced parallel relation and said pipe-receiving openings in axial alignment.

3. A pipe wiper comprising a pair of complementary wiper members, each member comprising a radially inner flexible portion having a central pipe-receiving opening and a radially outer portion having radially inner and outer spacer webs extending axially therefrom toward the other wiper member and means interconnecting said wiper members in assembled relation with the radially outer surface of each inner spacer web on one wiper member engaging the radially inner surface of a complementary outer spacer web on the other wiper member, whereby to maintain said flexible portions in axially spaced parallel relation and said pipe-receiving openings in axial alignment.

4. A pipe wiper comprising a pair of complementary wiper members, each member comprising a radially inner flexible portion having a central pipe-receiving opening and a radially outer portion having radially inner and outer segmental arcuate spacer webs extending axially therefrom toward the other wiper member, said inner webs being angularly offset relative to said outer webs, the arcuate side walls of said webs being concentric with said pipe-receiving opening and the radius of the radially outer side walls of said inner webs being substantially equal to the radius of the radially inner side walls of said outer webs, and means interconnecting said wiper members in assembled relation with each inner web of one wiper member nested within an outer web of the other wiper member, whereby to maintain said flexible portions in axially spaced parallel relation and said pipe-receiving openings in axial alignment.

5. A pipe wiper as set forth in claim 1 wherein said interconnecting means comprises a retainer element extending through a spacer web on each wiper member.

6. A pipe wiper as set forth in claim 1 wherein said spacer webs include walls defining radially extending bores adapted to be aligned when said webs are interfitted and wherein said interconnecting means comprises retainer elements extending through said bores and interlocking said webs.

7. A pipe wiper as set forth in claim 2, wherein said spacer webs are of such a length that there are defined openings between adjoining interfitted pairs of spacer webs.

8. A pipe wiping element comprising a member having a radially inner flexible portion formed with a central pipe-receiving opening and a radially outer portion formed with a radially inner and a radially outer spacer web extending in the same direction as the axis of said pipe-receiving opening, said inner web being angularly offset relative to said outer web, the arcuate side walls of said webs being concentric with said pipe-receiving opening and the radius of the radially outer side wall of said inner spacer web being substantially equal to the radius of the radially inner side wall of said outer spacer web, whereby pairs of such elements may be interconnected to form a tandem wiper having telescopically interfitted spacer webs.

9. A pipe wiping element comprising a flexible base member having a central pipe-receiving opening, said base member having axially extending inner and outer radially spaced spacer webs, said inner webs being angularly offset relative to said outer webs, the arcuate side walls of said webs being concentric with said pipe-receiving opening and each inner spacer web having an outer arcuate surface substantially equal in radius to that of an inner arcuate surface on an outer spacer web, whereby pairs of such elements may be interconnected to form a tandem wiper having telescopically interfitted spacer webs.

10. A pipe wiping element comprising a flexible base member having a central pipe-receiving opening, said base member having axially extending inner and outer radially spaced spacer webs, said spacer webs being displaced 90° apart about the axis of said base member opening, the arcuate side walls of said webs being concentric with said pipe-receiving opening and the inner spacer webs having outer arcuate surfaces substantially equal in radius to the inner arcuate surfaces on the outer spacer webs, whereby pairs of such elements may be interconnected to form a tandem wiper having telescopically interfitted spacer webs.

11. A pipe wiping element comprising a flexible base member having a central pipe-receiving opening, said base member having axially extending inner and outer radially spaced arcuate spacer webs, said spacer webs being displaced 90° apart about the axis of said base member opening and being of such arcuate length as to leave spaces between each spacer web, the arcuate side walls of said webs being concentric with said pipe-receiving opening and the inner spacer webs having outer arcuate surfaces substantially equal in radius to the inner radial surfaces on the outer spacer webs, whereby pairs of such elements may be interconnected to form a tandem wiper having telescopically interfitted spacer webs.

JOHN C. GRANT.

References Cited in the file of this patent

UNITED STATES PATENTS

| Number | Name | Date |
|---|---|---|
| 1,823,233 | Bell | Sept. 14, 1931 |
| 1,840,334 | Schuster | Jan. 12, 1932 |
| 2,255,829 | Spang et al. | Sept. 16, 1941 |
| 2,266,935 | Stephens et al. | Dec. 23, 1941 |
| 2,514,817 | Wheaton et al. | July 11, 1950 |
| 2,559,782 | Meek | July 10, 1951 |
| 2,568,247 | Medearis | Sept. 18, 1951 |